F. E. JOSEL.
APPARATUS FOR THE MANUFACTURE OF VINEGAR.
No. 88,642. Patented Apr. 6, 1869.
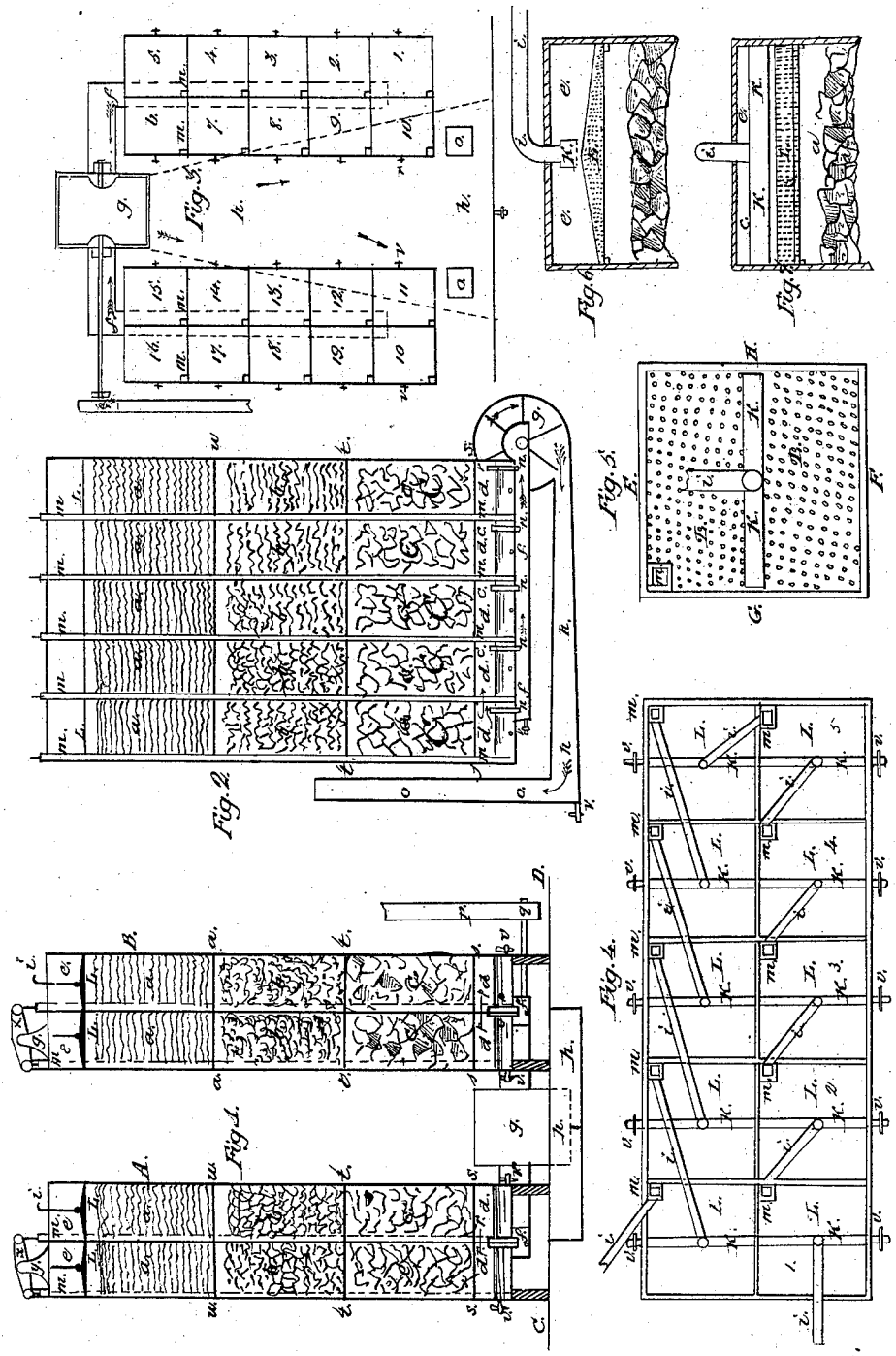

F. E. JOSEL, OF FREEPORT, ILLINOIS.

Letters Patent No. 88,642, dated April 6, 1869.

IMPROVED APPARATUS FOR THE MANUFACTURE OF VINEGAR.

The Schedule referred to in these Letters Patent and making part of the same.

*To all whom it may concern:*

Be it known that I, F. E. JOSEL, of Freeport, in the county of Stephenson, and State of Illinois, have invented certain new and useful Improvements in an Apparatus for Making Vinegar; and I do hereby declare the following to be a full, clear, and exact description of the same, reference being had to the accompanying drawings, making a part of this specification, in which—

Figure 1 is a vertical cross-section, through the apparatus.

Figure 2 is a longitudinal section, through one of the tanks.

Figure 3 is a section plan of the apparatus.

Figure 4 is a top plan of one of the tanks.

Figures 5, 6, and 7 represent detached portions of the apparatus.

To enable those skilled in the art to make and use my invention, I will proceed to describe the same with reference to the drawings.

The vinegar-concentrator, which invention I claim as my own, consists of two wooden boxes or tanks, A and B, figs. 1 and 3, about eight feet long, three feet wide, and twelve feet high, standing alongside of each other, about three feet apart. Each of these boxes is divided into ten equal compartments, as in figs. 3 and 4. Each of these compartments is subdivided into chambers, in the following manner:

About a foot from the bottom of the tanks is a perforated floor inserted, $s$ $s$, figs. 1 and 2, upon which a suitable filter is laid, whereupon a layer of charcoal, $c$ $c$, is placed, about the size of walnuts.

At a height of about three and a half feet from the first perforated floor, a second one, $t$ $t$, of the same construction, is inserted, figs. 1 and 2, and covered in the same manner, first with a filter, and then with smaller-sized crumbs of charcoal, $b$ $b$.

About the same height from the perforated floor $t$ $t$ is inserted a third one, $w$ $w$, also covered with a filter, and still smaller crumbs of charcoal, $a$ $a$, to about the same height as the former.

Above this is placed the vinegar-sieve, consisting of a square piece of perforated wood, with two slanting surfaces on the top, L L.

Above the ridge of the sieve is placed the distributer, $k$ $k$, figs. 5, 6, 7, consisting of a square wooden tube, the under side of which is perforated with small holes.

In the centre, above this tube, is the feeding-pipe $i$ $i$, figs. 1, 4, 5, 6, 7, perpendicularly fitted in. This pipe brings the prepared liquid from a reservoir.

In one corner of each compartment is placed a wooden pump, $m$ $m$, figs. 1 and 2, which reaches nearly to the bottom of the compartment $d$ $d$.

In the bottom of each compartment is inserted a small tube, $n$ $n$, figs. 1 and 2, which reaches nearly to the perforated floor $s$ $s$, but is sheltered from it by a piece of wood, $r$ $r$, figs. 1 and 2, fastened a little above the aperture of the small tube. This piece of wood serves as a roof, to prevent trickling liquid from falling into the tube.

The lower aperture of this tube opens into a channel, or flue $f$ $f$, figs. 1 and 2, which is fixed below the bottom, along the middle of the tank, fig. 3, and connects from both tanks with a ventilator, $g$, figs. 1, 2, 3.

The wind-flue $h$ $h$, figs. 1, 2, 3, is below the floor C D, fig. 1, and widens gradually toward the front, where two air-channels, $o$ $o$, figs. 2 and 3, are perpendicularly erected.

The bottom of the wind-flue, or cooler $h$ $h$, figs. 1, 2, 3, is grooved, and serves as a condenser, to precipitate those particles of alcohol which are yet contained in the warm air which is forced over the grooved surface by the centrifugal ventilator $g$, as the bottom of the cooler is kept cool from below.

The process of the vinegar-concentrator consists in the following:

The liquid is conducted through the feeding-pipe $i$ to the distributer $k$, where it spreads on the ridge, down the two slanting surfaces of the sieve L L, and trickles through on to the layer of charcoal, $a$, which prepares it for the second layer of charcoal, $b$, where the process of souring commences, as I use charcoal as a germinator, to produce the necessary ferment for the transformation of alcohol into acid of vinegar.

Passing through the perforated floor $t$, the liquid runs on the layer of charcoal $c$, and finally passes through the perforated floor $s$ into the bottom chamber $d$, where it accumulates, but is prevented from flowing into the small tube $n$ by the pump $m$, which keeps the liquid below the aperture of the small tube $n$. By means of the centrifugal ventilator a constant draught of air is produced.

As the air is warmed, and the apparatus supplied with it from the top of the compartments, the increasing interstices in the three layers of charcoal, $a$ $b$, $c$, admit an increased contact of the liquid with warm air, which facilitates the process of souring. But as the vinegar produced by one such single procedure would not be fit for use, I accomplish that object by a combination of twenty such apparatus.

The pump $m$, in the first compartment, conducts the liquid to the top of the second one, the pump of the second compartment conducts the liquid to the third compartment, and so on until the twentieth compartment, the pump of which conducts the liquid, which is now vinegar, from it to the vinegar-reservoir.

Each compartment has near the bottom of the lowest chamber a faucet, $v$, to try the strength of the vinegar; also the wind-channels $f$ $f$, and the condenser $h$ $h$, below the floor, are furnished with a faucet, $v$, figs. 1, 3, 4.

The ten pumps of each tank are all worked simultaneously by double-armed levers $x$, fig. 1, fastened on one common axle. It may be set in motion by steam, water, or horse-power.

In the same way the centrifugal ventilator may be worked. By this combination of procedure I am enabled to save time and labor.

The machine yields twenty barrels of good vinegar in twenty-four hours, and can be managed by one man.

The principal points that I claim for the invention in the manufacture of vinegar, and which I wish to secure by Letters Patent, are—

1. The sieve L L, with its slanting surfaces.
2. The pumps in each corner of the compartments.
3. The air-channel $f\,f$, and the application of the centrifugal ventilator G, to produce a draught through the compartment.
4. The condenser $h\,h$, with the two flues $o\,o$, to precipitate the alcohol-containing vapors.
5. The combination of compartments, to work together, as ten, twenty, or more, in one complete apparatus or machine.

F. E. JOSEL.

Witnesses:
OSCAR TAYLOR,
S. F. ASPINWALL.